United States Patent [19]

Fitzsimmons

[11] 3,773,242

[45] Nov. 20, 1973

[54] WAVE SOLDERING APPARATUS HAVING UNOBSTRUCTED WORK PIECE PATH

[75] Inventor: Robert D. Fitzsimmons, Windham, N.H.

[73] Assignee: Gale Systems, Inc., Andover, Mass.

[22] Filed: Feb. 24, 1972

[21] Appl. No.: 228,812

[52] U.S. Cl.............. 228/37, 29/471.1, 29/503, 118/400, 228/40
[51] Int. Cl............................................ B23k 1/08
[58] Field of Search .............. 228/33, 36, 37, 40; 29/471.1, 503; 118/400, 423, DIG. 24

[56] References Cited
UNITED STATES PATENTS

| | | | |
|---|---|---|---|
| 3,037,274 | 6/1962 | Hancock | 29/503 X |
| 3,039,185 | 6/1962 | Oates | 228/37 X |
| 3,082,520 | 3/1963 | Hepner | 29/503 X |
| 3,196,829 | 7/1965 | Elliott et al. | 228/37 X |

Primary Examiner—J. Spencer Overholser
Assistant Examiner—Robert J. Craig
Attorney—Vern Schooley

[57] ABSTRACT

The wave soldering apparatus of present disclosure includes a sump for receipt of a predetermined level of molten solder and having a driveshaft-receiving opening in the bottom wall thereof. A fountain is disposed in such sump and is formed with a chamber that leads upwardly above the predetermined level and terminates in a horizontally disposed outlet orifice. Molten solder is pumped into the lower portion of such fountain by pump means which includes an impeller having a driveshaft projecting therefrom and through the driveshaft-receiving opening. Barrier means surrounds such driveshaft means to block molten solder from coming into contact therewith and leaking out through the driveshaft-receiving opening.

7 Claims, 5 Drawing Figures

INVENTOR.
ROBERT D. FITZSIMMONS
BY Fulwider, Patton, Rieber, Lee and Utecht
ATTORNEYS

INVENTOR.
ROBERT D. FITZSIMMONS

WAVE SOLDERING APPARATUS HAVING UNOBSTRUCTED WORK PIECE PATH

BACKGROUND OF THE INVENTION

1. Field of the Invention

The present invention relates to a soldering device for pumping molten solder upwardly through a fountain to create a standing wave of molten solder for having components passed into contact therewith for soldering thereof.

2. Description of the Prior Art

Numerous wave soldering devices have been proposed for producing a standing molten solder wave for enabling electrical components to be passed therethrough. However, most of such prior art devices include a horizontally disposed pump impeller disposed in the bottom of the sump and having a driveshaft projecting upwardly therefrom to connect with a drive motor disposed above the surface of the hot molten solder. Such devices suffer the shortcoming that the drive mechanisms are located above the sumps and obstruct the freedom to approach horizontally with a conveyor the orifice from all directions and also obstruct the activities of workmen working with such devices.

Other wave soldering devices have been proposed which include a solder pump having a driveshaft projecting through the wall of the sump, but difficulty is encountered in attempting to seal such driveshafts in a manner that will hold up under the extremely hot temperatures required to maintain the solder in its molten state. A wave soldering apparatus of this type is shown in U.S. Pat. No. 3,092,059. Applicant is also aware of the following U.S. Patents:

| | |
|---|---|
| 3,277,566 | Christensen |
| 3,266,136 | Gutbier |
| 3,430,332 | Roczey-Koller |
| 3,056,370 | Barnes |
| 3,082,520 | Hepner |
| 3,004,505 | Dvorak |
| 3,037,274 | Hancock |
| 3,100,471 | Gutbier |

SUMMARY OF THE INVENTION

The soldering apparatus of the present invention is characterized by a pump submerged in the solder sump and having a driveshaft projecting through the sump wall and surrounded by a barrier to block solder from impinging on such driveshaft and leaking out therearound.

The objects and advantages of the present invention will become apparent from a consideration of the following detailed description when taken in conjunction with the accompanying drawings.

DESCRIPTION OF THE PREFERRED EMBODIMENT

Figure 1:
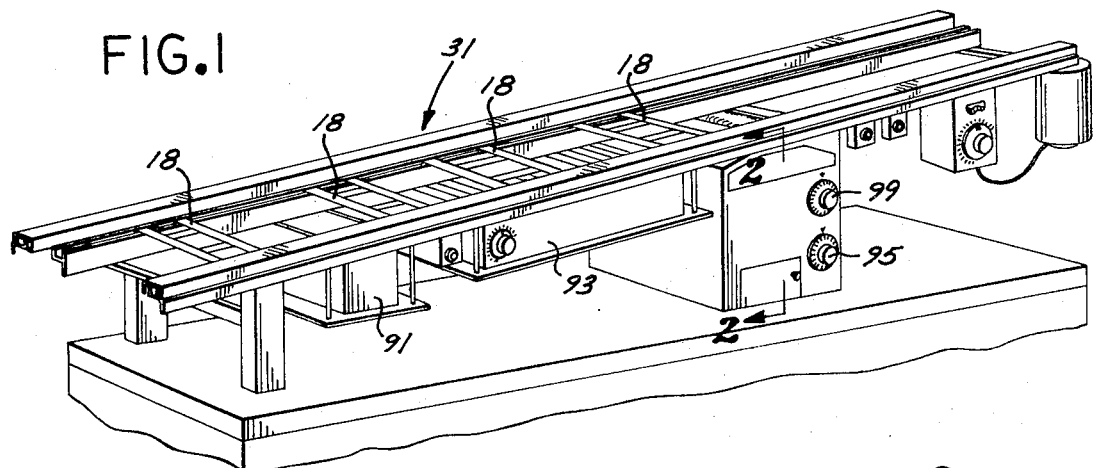
FIG. 1 is a perspective view of a wave soldering apparatus of present inven-tion with a work piece carrying conveyor extending thereover.
Figure 2:
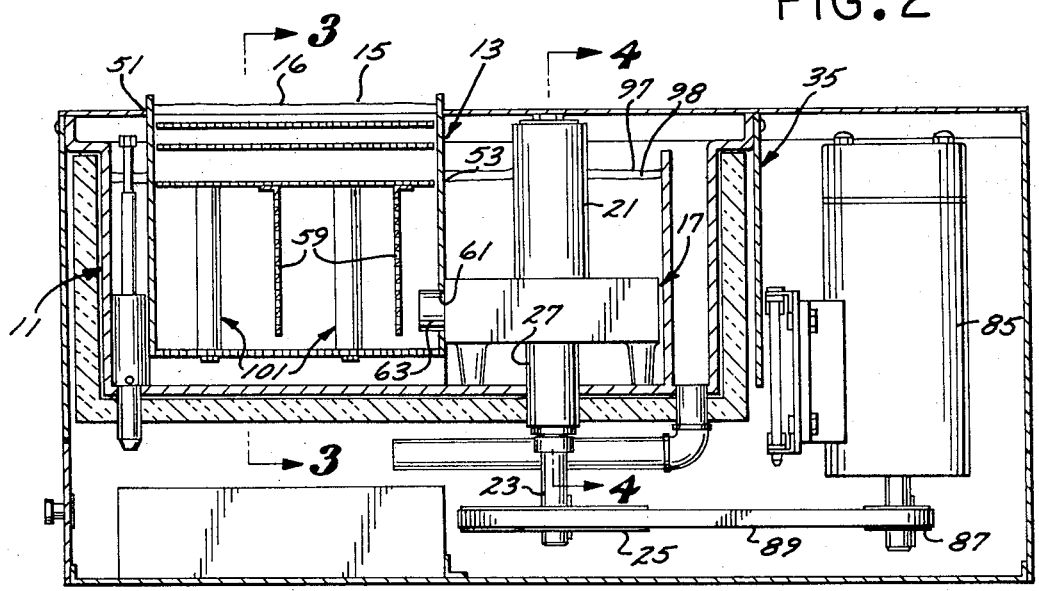
FIG. 2 is a vertical sectional view. in enlarged scale, taken along the line 2—2 of FIG. 1.
Figure 4:
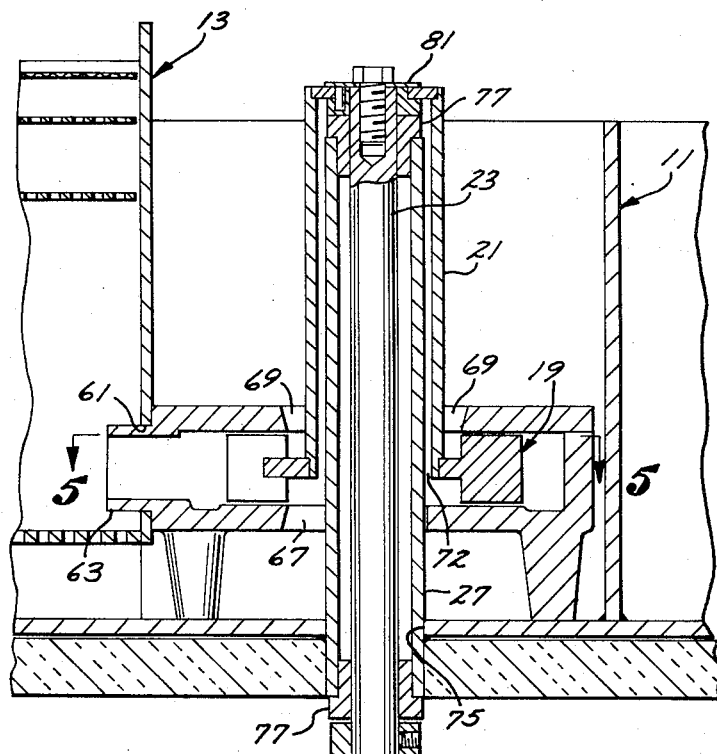
FIG. 4 is a vertical sectional view, in enlarged scale, taken along the line 4—4 of FIG. 2.

Referring to FIGS. 2 and 4, the wave soldering apparatus of present invention includes, generally, a sump 11 having a fountain 13 therein, such fountain extending upwardly to terminate in a horizontally disposed orifice 15. Solder is pumped into the lower portion of the fountain 13 by means of a solder pump 17 which has a horizontally disposed impeller 19 (FIG. 4) driven by an upwardly extending drive pipe 21 which is connected on its upper end with a co-axial driveshaft 23 which projects downwardly through the bottom wall of the sump 11 and has a driven pulley 25 on its lower extremity. An upstanding barrier tube 27 projects upwardly from the bottom wall of the sump 11 and is telescoped between the driveshaft 23 and drive pipe 21 to block molten solder from contacting the driveshaft 23 and leaking out around such driveshaft. Consequently, the driveshaft 23 may be driven from the bottom end thereof to drive the impeller 19 and pump molten solder into the lower portion of the fountain 13 to force such molten solder upwardly in such fountain to flow out the horizontal orifice 15 and form a standing wave 16 thereover for having work pieces 18 (FIG. 1) brought into contact therewith for soldering thereof. Since the pump 17 is driven from the bottom side of the sump 11, there is no requirement for disposing a drive motor above such sump and, consequently, the area above such sump 11 is left unobstructed to enable a conveyor, generally designated 31, (FIG. 1) to be placed over such wave 16 for carrying work pieces 18 (FIG. 1) into contact with such wave 16, and the activity of workment working with such pieces will not be obstructed by a drive mechanism, nor will the freedom to approach orifice 15 from any horizontal direction by a conveyor 31 be obstructed by any drive mechanism.

Figure 3:
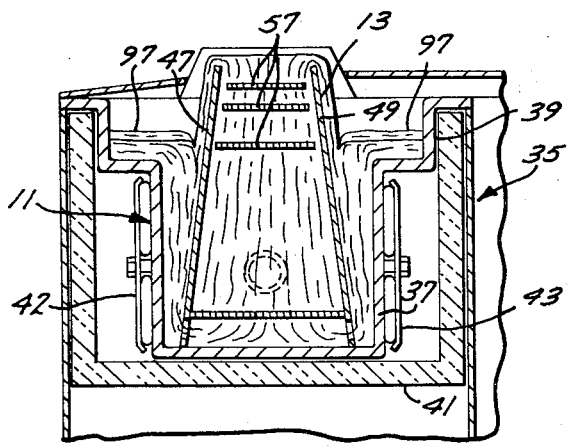
FIG. 3 is a vertical sectional view taken along the line 3—3 of FIG. 2.

Referring to FIG. 3, the sump 11 is supported in a cabinet, generally designated 35, and is formed in transverse cross section with side walls that define a reduced-in-cross section lower portion 37 that flares outwardly to form an enlarged upper portion 39. The sump 11 is insulated by means of insulation 41 and has heaters 42 and 43 mounted along the sides thereof for heating the molten solder.

Still referring to FIG. 3, the fountain 13 includes a pair of upwardly and inwardly angled side walls 47 and 49 and a pair of upright end walls 51 and 53 (FIG.2) which project slightly above the upper edge of the side walls 47 and 49 to direct the spill from the solder wave 16 to the sides of the fountain 13 and prevent spillage thereof over the end walls of such fountain. A series of horizontal baffles 57 are disposed in the upper portion of the fountain 13 to baffle the solder flow and maintain a uniform wave 16. A series of vertical baffles 59 are also provided for assisting in maintaining uniform flow.

Referring to FIG. 2, the fountain end wall 53 is formed in its lower extremity with a through bore 61 for receipt of a pump outlet fitting 63 that directs flow to the center of the fountain 13.

Figure 5:
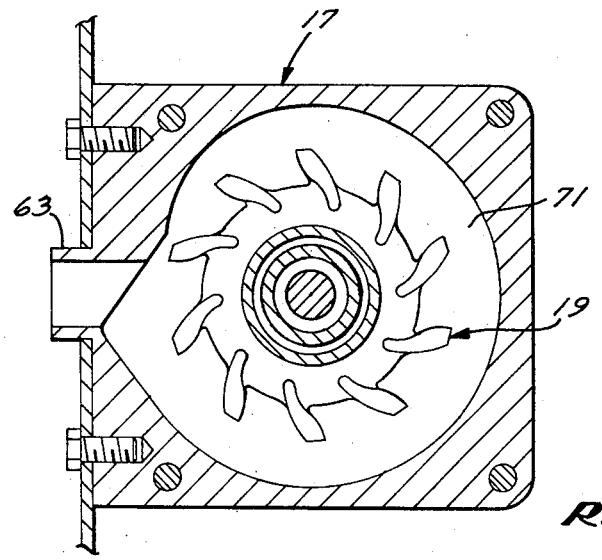
FIG. 5 is a horizontal sectional view taken along the line 5—5 of FIG. 4.

Referring to FIGS. 4 and 5, the pump 17 includes a housing which is formed with a vertically extending through central passage for receiving the barrier tube 27 and which forms a bottom inlet 67 and top inlet 69. Referring to FIG. 5, the housing 17 is formed with a horizontally extending impeller chamber 71 that receives the impeller 19 and such impeller also includes a through central passage 72 (FIG.4) which has the lower end of the drive pipe 21 received therein and welded thereto. The barrier tube 27 is telescoped upwardly inside the drive pipe 21 and has its lower end projecting through an opening 75 in the bottom wall of the sump 11 and welded to such wall. Bearings 77 are received in the upper and lower extremities of the barrier tube 27 for receipt of the driveshaft 23. The upper end of the driveshaft 23 is coupled to the upper end of the drive pipe 21 by means of a coupling unit 81.

Referring to FIG. 2, a vertically extending drive motor 85 is mounted to the cabinet structure 35 with its driveshaft projecting downwardly and carrying a drive pulley 87 which is coupled with the driven pulley 25 by means of a V-belt 89.

Referring to FIGS. 1 and 2 in operation, the circuit boards or the like to be soldered are placed on the conveyor 31 which has one end extending over the top of the sump 11. Disposed under the opposite end of such conveyor 31 are a fluxer 91 and preheater 93.

Solder is placed in the sump 11 to a level 98 (FIG. 2) below the top of the drive pipe 21 and the temperature control knob 95 (FIG. 1) turned to the desired temperature to energize the heaters 42 and 43 (FIG.3) and maintain the solder at the desired temperature. It is common practice to float a layer of oil compound 97 on top of the solder for isolating such solder from the air to prevent oxidation thereof and consequent formation of a film or dross thereon. Further, the oil compound 97 is mixed with the solder as it flows from the fountain 13 to provide a desired ratio of oil compound to solder in the wave 16 and to facilitate soldering of the work pieces. This feature is more fully explained in my U. S. Pat. No. 3,589, 590.

Referring to FIGS. 1, 2 and 4 the pump control knob 99 (FIG.1) is then turned to actuate the motor 85 and the desired pump rate is dialed to rotate the driveshaft 23 and consequently, the drive pipe 21 to rotate the impeller 19 and commence pumping of solder out the directional pump outlet 63 and into the fountain 13. The molten solder and oil compound mixture passing upwardly in the fountain 13 passes out through the orifice 15 to produce a smooth wave 16 and the work pieces 18 are brought into contact with such wave for soldering thereof.

Referring to FIGS. 2 and 5(as described in U.S. Pat. No. 3,589,590) by increasing the speed of the pump 17, the flow rate spilling from the wave 16 will be increased thereby drawing greater quantities of oil compound 97 with the solder moving downwardly through the molten solder and into the inlets 67 and 69 of the pump 17 to increase the ratio of oil compound to solder in the fountain and, consequently, in the wave 16. It has been found that the provision of the inlet 69 on the top side of the pump 17 for direct receipt of oil compound 97 passing downwardly from the top surface of the solder and location of the inlet 67 on the bottom side of the pump 17 to somewhat isolate such inlet from direct communication with the downwardly moving solder provides the desired ratio of oil compound to solder in the normal operating ranges.

It is particularly important that the pump 17 is driven from the bottom side of the sump 11 thereby enabling the conveyor 31 (FIG.1) to be placed approaching from any horizontal direction directly over the fountain 13 and enabling workmen to work around such conveyor without hindrance by motors and the like located above the top of the sump 11. Further, provision of the barrier tube 27 effectively blocks molten solder from contact with the driveshaft 23 and thereby eliminates the normal sealing problems associated with high temperature solder of this type.

From the foregoing it will be apparent that the soldering apparatus of present invention provides an economical and convenient means for maintaining a standing solder wave above the sump structure and without obstruction by any drive mechanism.

Various modifications and changes may be made with regard to the foregoing detailed description without departing from the spirit of the present invention.

I claim:

1. Bottom drive soldering apparatus comprising:
   a sump for receipt of a predetermined level of molten solder compound and having one wall formed with a drive shaft-receiving opening disposed in the lower portion thereof;
   a fountain disposed in said sump and formed in its lower portion with an inlet and including an upwardly opening horizontally extending orifice disposed at the top of said apparatus;
   pump means disposed in said sump for pumping molten solder compound in said inlet and including impeller means having drive shaft means extending therefrom and through said opening;
   driven means on the projecting extremity of said drive shaft means;
   barrier tube means surrounding said drive shaft means and projecting upwardly to said predetermined level for blocking molten solder compound from contacting said drive shaft means and leaking out said drive shaft-receiving opening; and
   drive means coupled with said driven means for driving said impeller means to pump molten solder compound from said sump in said inlet and upwardly in said fountain and out said orifice to form a standing wave located above said apparatus so work pieces to be soldered may be passed along any horizontal path to engage said wave, and the activity of workmen working therewith will be unobstructed by said drive means.

2. Wave soldering apparatus as set forth in claim 1 wherein:
   said barrier means includes a barrier tube telescoped over said driveshaft means and projecting from said opening to said pump means.

3. Wave soldering apparatus as set forth in claim 1 wherein:
   said impeller means is arranged with its axis extending vertically and is formed in its center with a through vertical passage; and
   said driveshaft means includes hollow drive pipe means projecting upwardly from the center of said impeller and terminating in an upper extremity disposed above said predetermined level and a driveshaft projecting upwardly into said driveshaft pipe means; and
   coupling means coupling said upper extremity of said drive pipe means to the upper extremity of said driveshaft.

4. Wave soldering apparatus as set forth in claim 1 wherein:
   said pump means is disposed exteriorly of said fountain and is arranged with the axis of said impeller means extending vertically, said pump means including a housing formed in its top and bottom sides with respective upper and lower inlets for receiving a selected ratio of solder and oil compound for said pump means whereby oil compound means may be floated on said molten solder and a predetermined ratio of oil compound means will be drawn in said inlets during operation of said pump means.

5. Wave soldering apparatus as set forth in claim 1 wherein:
 said impeller means is arranged with its axis extending vertically;
 said shaft-receiving opening is formed in the bottom wall of said sump for and receiving said shaft means.

6. Wave soldering apparatus as set forth in claim 1 that includes:
 bearing means interposed between said driveshaft means and said barrier means.

7. Wave soldering apparatus as set forth in claim 3 that includes:
 bearing means interposed between said driveshaft means and said barrier means.

* * * * *